(12) United States Patent
Magar

(10) Patent No.: US 10,248,787 B1
(45) Date of Patent: Apr. 2, 2019

(54) SYSTEMS AND METHODS FOR DETERMINING REPUTATIONS OF FILES

(71) Applicant: Symantec Corporation, Mountain View, CA (US)

(72) Inventor: Sujit Magar, Pune (IN)

(73) Assignee: Symantec Corporation, Mountain View, CA (US)

( * ) Notice: Subject to any disclaimer, the term of this patent is extended or adjusted under 35 U.S.C. 154(b) by 142 days.

(21) Appl. No.: 15/384,343

(22) Filed: Dec. 20, 2016

(51) Int. Cl.
   *H04L 29/06* (2006.01)
   *G06F 21/55* (2013.01)
   *G06F 21/56* (2013.01)

(52) U.S. Cl.
   CPC .......... *G06F 21/554* (2013.01); *G06F 21/565* (2013.01); *H04L 63/145* (2013.01)

(58) Field of Classification Search
   CPC ... G06F 21/554; G06F 21/565; H04L 63/145; H04L 63/1416; H04L 63/1425
   USPC .................................................... 726/22–25
   See application file for complete search history.

(56) References Cited

U.S. PATENT DOCUMENTS

| | | | | |
|---|---|---|---|---|
| 5,956,481 A * | 9/1999 | Walsh | .................... | G06F 21/566 713/188 |
| 7,739,740 B1 * | 6/2010 | Nachenberg | .......... | G06F 21/566 709/206 |
| 8,001,606 B1 * | 8/2011 | Spertus | ................. | G06F 21/564 709/203 |
| 8,407,793 B2 * | 3/2013 | Demblewski | ......... | G06F 21/567 713/188 |
| 8,726,388 B2 * | 5/2014 | Turbin | .................. | G06F 21/566 726/24 |
| 2017/0374094 A1 * | 12/2017 | Agarmore | ........... | H04L 63/1441 |
| 2018/0152470 A1 * | 5/2018 | Lu | ....................... | H04L 63/1425 |

OTHER PUBLICATIONS

Run and RunOnce Registry Keys; Microsoft; published on Mar. 13, 2012 accessed on Dec. 6, 2016 as published on the internet at https://msdn.microsoft.com/en-us/library/windows/desktop/aa376977(v=vs.85).aspx.

* cited by examiner

*Primary Examiner* — Hosuk Song
(74) *Attorney, Agent, or Firm* — FisherBroyles, LLP (57) ABSTRACT

The disclosed computer-implemented method for determining reputations of files may include (i) identifying, on an endpoint device, a loadpoint data entry created by a file installed on the endpoint device that directs an operating system of the endpoint device to execute the file during boot up operations of the endpoint device, (ii) determining a reputation of the loadpoint data entry, (iii) detecting, on an additional endpoint device, an attempt to install a suspicious file with a loadpoint data entry at least partially similar to the loadpoint data entry of the file installed on the endpoint device, (iv) determining a reputation of the suspicious file based on the reputation of the loadpoint data entry of the file installed on the endpoint device, and (v) protecting the additional endpoint device from security threats by performing a security action on the suspicious file based on the reputation of the suspicious file.

20 Claims, 7 Drawing Sheets

Table of Reputation Scores and Corresponding Security Actions
502

| Reputation Score | Security Action |
|---|---|
| 1 | Block Installation of File |
| 2, 3 | Query User for Installation Decision |
| 4, 5 | Send File to Security Server for Analysis |
| 6 | Allow Installation of File |

SYSTEMS AND METHODS FOR DETERMINING REPUTATIONS OF FILES

BACKGROUND

Individuals and organizations often wish to protect their computing devices from malware, data leaks, intrusions, and other security threats. As such, anti-malware and other security services may develop systems to detect malicious files on endpoint devices. In particular, malware detection systems may attempt to identify malicious files before users download or install the files onto their endpoint devices. In some examples, traditional malware detection systems may identify malware by analyzing properties of suspicious or unverified files. Specifically, a conventional anti-malware system may analyze content within files (e.g., by computing hashes of the files and comparing the hashes to hashes of known malware). In addition, some conventional malware detection technologies may identify malicious files by monitoring behaviors exhibited by the files.

Unfortunately, conventional malware detection systems may be unable to efficiently and accurately determine a reputation of a file that a user is attempting to install on an endpoint device. For example, analyzing content of a file and/or computing a hash of a file may require extensive time and computing resources. In addition, analyzing behavior of a file after it has been installed on an endpoint device may expose the endpoint device to security threats. The instant disclosure, therefore, identifies and addresses a need for systems and methods for determining reputations of files.

SUMMARY

As will be described in greater detail below, the instant disclosure describes various systems and methods for determining reputations of files. In one example, a method for determining reputations of files may include (i) identifying, on an endpoint device, a loadpoint data entry created by a file installed on the endpoint device that directs an operating system of the endpoint device to execute the file during boot up operations of the endpoint device, (ii) determining a reputation of the loadpoint data entry that indicates a reputation of the file, (iii) detecting, on an additional endpoint device, an attempt to install a suspicious file with a loadpoint data entry at least partially similar to the loadpoint data entry of the file installed on the endpoint device, (iv) determining a reputation of the suspicious file based on the reputation of the loadpoint data entry of the file installed on the endpoint device, and (v) protecting the additional endpoint device from security threats by performing a security action on the suspicious file based on the reputation of the suspicious file.

In some examples, identifying the loadpoint data entry on the endpoint device may include identifying a registry key that points to a filepath of the file. Additionally or alternatively, identifying the loadpoint data entry on the endpoint device may include receiving, at a backend security server, each unique loadpoint data entry identified on a group of endpoint devices by a security agent installed on each endpoint device within the group. In these examples, determining the reputation of the loadpoint data entry may include determining whether the loadpoint data entry is more frequently associated with files installed on the group of endpoint devices known to be malicious or files installed on the group of endpoint devices known to be non-malicious. In addition, determining the reputation of the loadpoint data entry may include determining a prevalence of the loadpoint data entry across the group of endpoint devices, where a low prevalence indicates a malicious reputation. Additionally or alternatively, determining the reputation of the loadpoint data entry may include determining a length of time that each of the plurality of endpoint devices has stored the loadpoint data entry, where a large amount of time indicates a non-malicious reputation.

In some embodiments, detecting the attempt to install the suspicious file on the additional endpoint device may include blocking the attempt to install the suspicious file until determining the reputation of the suspicious file. Additionally or alternatively, detecting the attempt to install the suspicious file may include monitoring an installation process of the suspicious file to identify the loadpoint data entry created by the suspicious file during the installation process.

In some examples, determining the reputation of the suspicious file may include determining that the suspicious file is non-malicious. In these examples, performing the security action on the suspicious file may include permitting the suspicious file to be installed on the additional endpoint device. In other examples, determining the reputation of the suspicious file may include determining that the suspicious file is potentially suspicious. In these examples, performing the security action on the suspicious file may include prompting a user of the additional endpoint device to determine whether to install the suspicious file and/or sending the suspicious file to a backend security server to analyze content of the suspicious file. In further examples, determining the reputation of the suspicious file may include determining that the suspicious file is malicious. In these examples, performing the security action on the suspicious file may include preventing the suspicious file from being installed on the additional endpoint device.

In one embodiment, a system for determining reputations of files may include several modules stored in memory, including (i) an identification module that identifies, on an endpoint device, a loadpoint data entry created by a file installed on the endpoint device that directs an operating system of the endpoint device to execute the file during boot up operations of the endpoint device, (ii) a detection module that detects, on an additional endpoint device, an attempt to install a suspicious file with a loadpoint data entry at least partially similar to the loadpoint data entry of the file installed on the endpoint device, (iii) a reputation module that (a) determines a reputation of the loadpoint data entry created by the file installed on the endpoint device that indicates a reputation of the file and (b) determines a reputation of the suspicious file based on the reputation of the loadpoint data entry of the file installed on the endpoint device, and (iv) a security module that protects the additional endpoint device from security threats by performing a security action on the suspicious file based on the reputation of the suspicious file. In addition, the system may include at least one physical processor configured to execute the identification module, the detection module, the reputation module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify, on an endpoint device, a loadpoint data entry created by a file installed on the endpoint device that directs an operating system of the endpoint device to execute the file during boot up operations of the endpoint device, (ii) determine a reputation of the loadpoint data entry that indicates a reputation of the file, (iii) detect, on an additional endpoint device, an attempt to install a suspicious file with a loadpoint data entry at least partially similar to the loadpoint data entry of the file installed on the endpoint device, (iv) determine a reputation of the suspicious file based on the reputation of the loadpoint data entry of the file installed on the endpoint device, and (v) protect the additional endpoint device from security threats by performing a security action on the suspicious file based on the reputation of the suspicious file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for determining reputations of files. As will be explained in greater detail below, by analyzing the distribution of loadpoint data entries (e.g., instructions that prompt a device to execute a file during boot up operations) across a group of endpoint devices and/or by analyzing files that created the loadpoint data entries, the disclosed systems and methods may identify loadpoint data entries associated with malicious files and loadpoint data entries associated with non-malicious files. As such, the systems and methods described herein may prevent a malicious file from being installed on an endpoint device by identifying and analyzing a loadpoint data entry created by the file during the file's installation process.

In addition, the systems and methods described herein may improve the functioning of a computing device by efficiently and accurately detecting malicious files the computing device is attempting to install, thus reducing the computing device's likelihood of a malware infection. These systems and methods may also improve the field of malware detection by reducing or eliminating the need to analyze content of a suspicious file to determine the file's reputation.

Figure 1:
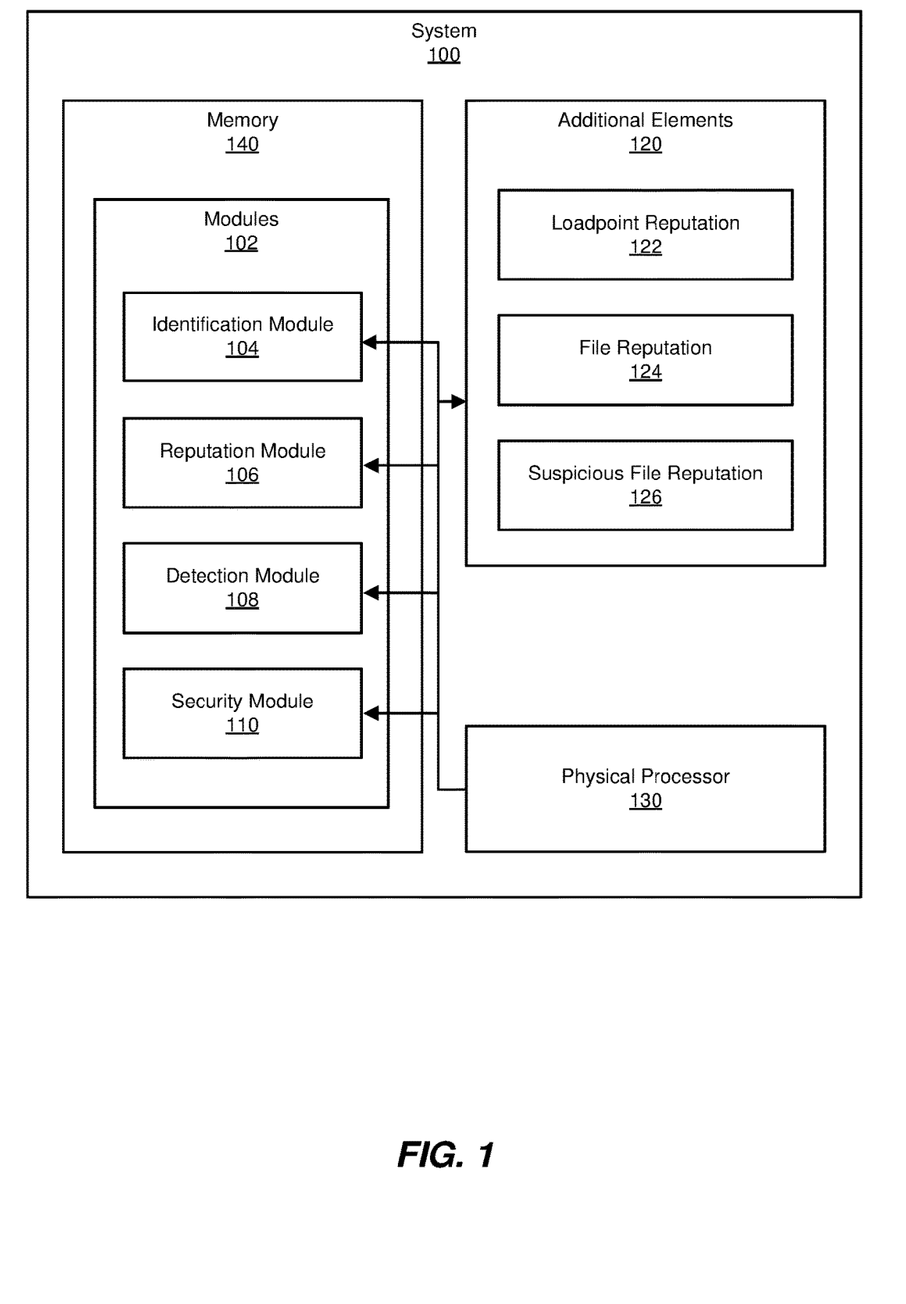
FIG. 1 is a block diagram of an example system for determining reputations of files.
Figure 2:
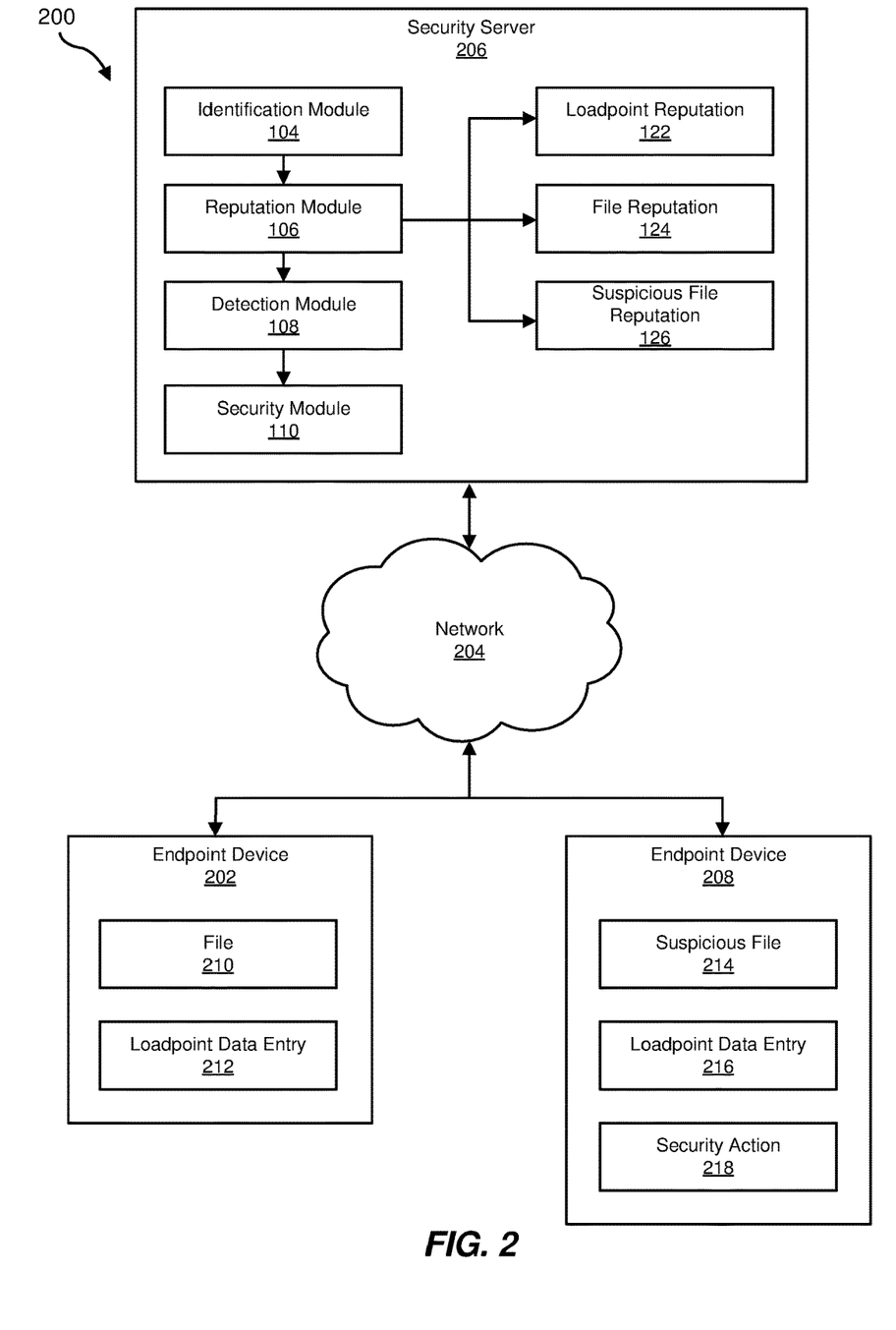
FIG. 2 is a block diagram of an additional example system for determining reputations of files.
Figure 3:
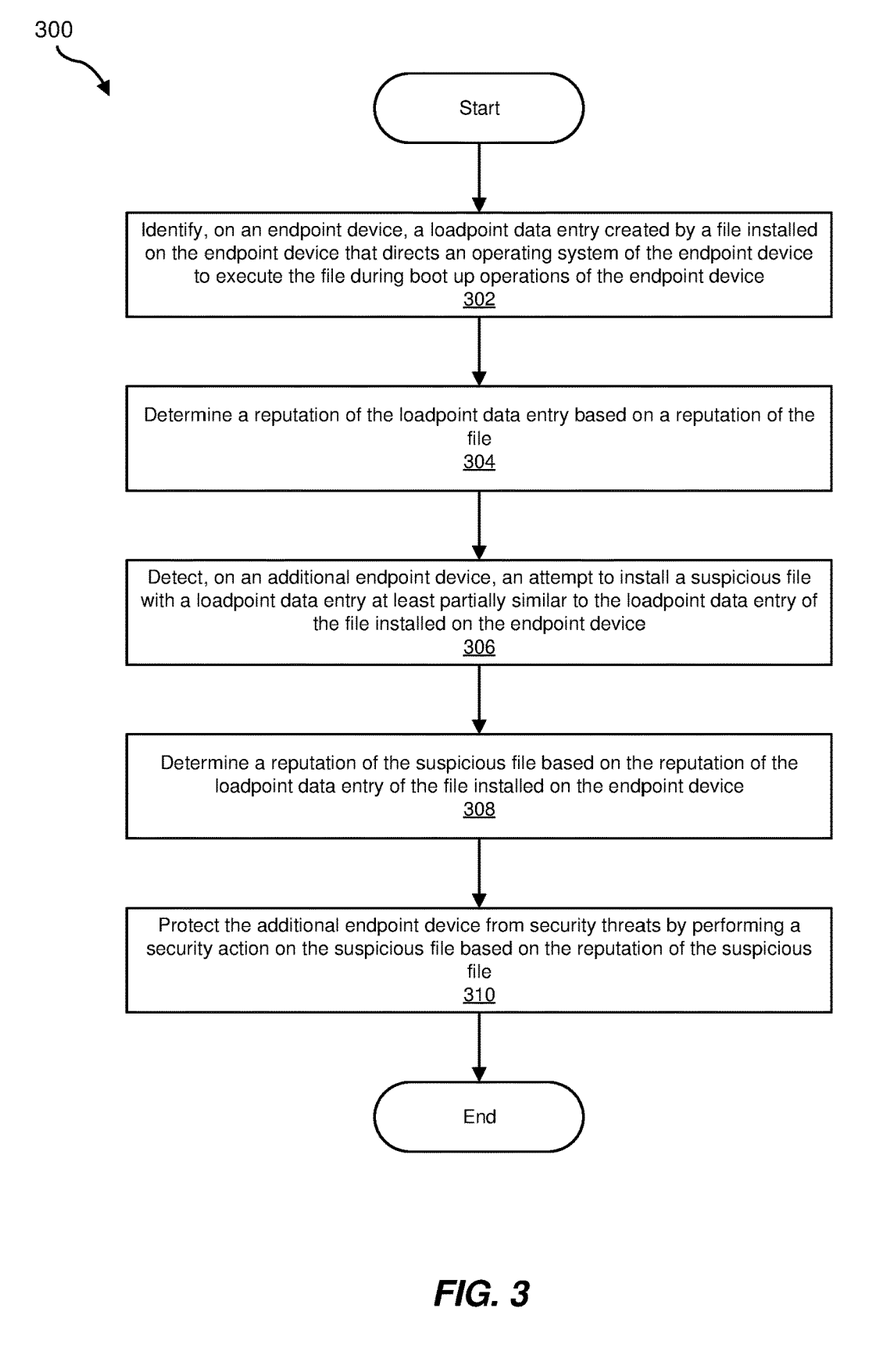
FIG. 3 is a flow diagram of an example method for determining reputations of files.
Figure 4:
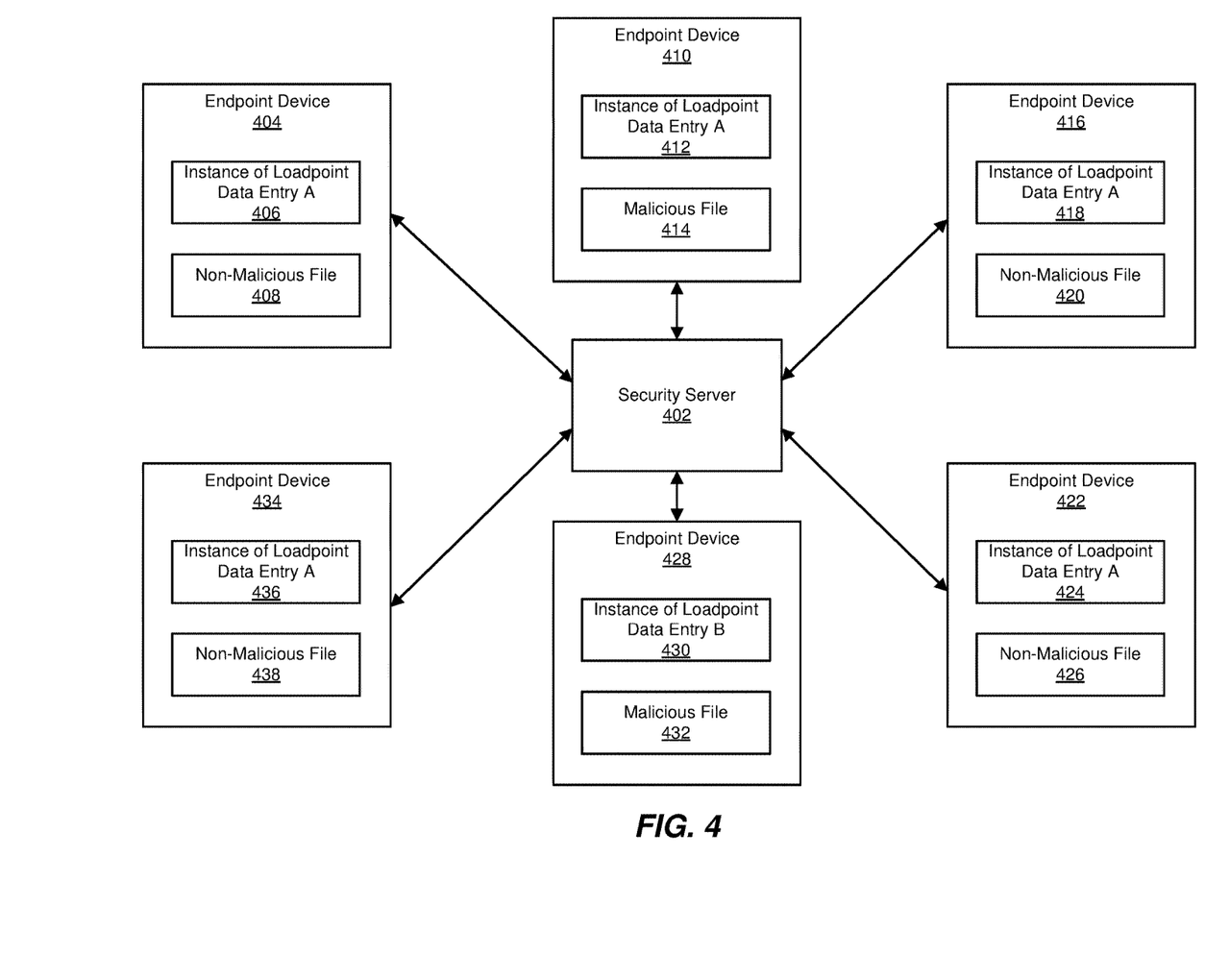
FIG. 4 is a block diagram of an additional example system for determining reputations of files.

The following will provide, with reference to FIGS. 1, 2, and 4, detailed descriptions of example systems for determining reputations of files. Detailed descriptions of corresponding computer-implemented methods will also be provided in connection with FIG. 3. In addition, detailed descriptions of example tables listing reputation scores of suspicious files and corresponding security actions will be provided in connection with FIG. 5. Finally, detailed descriptions of an example computing system and network architecture capable of implementing one or more of the embodiments described herein will be provided in connection with FIGS. 6 and 7, respectively.

FIG. 1 is a block diagram of an example system 100 for determining reputations of files. As illustrated in this figure, example system 100 may include one or more modules 102 for performing one or more tasks. As will be explained in greater detail below, example modules 102 may include an identification module 104, a reputation module 106, a detection module 108, and a security module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., endpoint device 202, endpoint device 208, and/or security server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate determining reputations of files. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120. Additional elements 120 may include reputations of one or more files and/or loadpoint data entries, such as a loadpoint reputation 122, a file reputation 124, and a suspicious file reputation 126. In some examples, loadpoint reputation 122 may indicate the reputation of a loadpoint data entry created by a file whose reputation is indicated by file reputation 124. As such, loadpoint reputation 122 may correspond to or be the same as file reputation 124. In addition, suspicious file reputation 126 may indicate the reputation of a file that created a loadpoint data entry that matches the loadpoint data entry of the file associated with file reputation 124. Accordingly, suspicious file reputation 126 may also correspond to or be the same file reputation 124.

Example system 100 in FIG. 1 may be implemented in a variety of ways. For example, all or a portion of example system 100 may represent portions of example system 200 in FIG. 2. As shown in FIG. 2, system 200 may include an endpoint device 202 and an endpoint device 208 in communication with a security server 206 via a network 204. In one example, all or a portion of the functionality of modules 102 may be performed by endpoint device 202, endpoint device 208, security server 206, and/or any other suitable computing system. As will be described in greater detail below, one or more of modules 102 from FIG. 1 may, when executed by at least one processor of endpoint device 202, endpoint device 208, and/or security server 206, enable endpoint device 202, endpoint device 208, and/or security server 206 to determine reputations of files.

For example, and as will be described in greater detail below, identification module 104 may cause security server 206 and/or endpoint device 202 to identify, on endpoint device 202, a loadpoint data entry 212 created by a file 210 installed on endpoint device 202 that directs an operating system of endpoint device 202 to execute file 210 during boot up operations of endpoint device 202. Reputation module 106 may then cause security server 206 and/or endpoint device 202 to determine loadpoint reputation 122 of loadpoint data entry 212, which indicates file reputation 124 of file 210. Next, detection module 108 may cause security server 206 and/or endpoint device 208 to detect, on endpoint device 208, an attempt to install a suspicious file 214 with a loadpoint data entry 216 that is at least partially similar to loadpoint data entry 212 of file 210. Reputation module 106 may then cause security server 206 and/or endpoint device 208 to determine suspicious file reputation 126 of suspicious file 214 based on loadpoint reputation 122. Finally, security module 110 may cause security server 206 and/or endpoint device 208 to protect endpoint device 208 from security threats by performing a security action 218 on suspicious file 214 based on suspicious file reputation 126.

Endpoint device 202 and endpoint device 208 generally represent any type or form of computing device capable of reading computer-executable instructions. In some examples, endpoint devices 202 and 208 may represent personal computing devices and/or computing devices managed by an organization that run client-side security or anti-malware software. Additional examples of endpoint device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Security server 206 generally represents any type or form of computing device that is capable of determining reputations of files based on loadpoint data entries of the files. In some examples, security server 206 may represent a backend security server that provides anti-malware services to one or more endpoint devices. Additional examples of security server 206 include, without limitation, security servers, application servers, web servers, storage servers, and/or database servers configured to run certain software applications and/or provide various security, web, storage, and/or database services. Although illustrated as a single entity in FIG. 2, security server 206 may include and/or represent a plurality of servers that work and/or operate in conjunction with one another.

Network 204 generally represents any medium or architecture capable of facilitating communication or data transfer. In one example, network 204 may facilitate communication between endpoint device 202, endpoint device 208, and security server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an example computer-implemented method 300 for determining reputations of files. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify, on an endpoint device, a loadpoint data entry created by a file installed on the endpoint device that directs an operating system of the endpoint device to execute the file during boot up operations of the endpoint device. For example, identification module 104 may, as part of security server 206 and/or endpoint device 202 in FIG. 2, identify, on endpoint device 202, loadpoint data entry 212 that was created by file 210.

The term "file," as used herein, generally refers to any type or form of software, portion of executable code, or other unit of formatted data. In general, a file represents any portion of data that may be installed on and/or executed by a computing device. In addition, the term "loadpoint data entry," as used herein, generally refers to any type or form of instruction, command, or mechanism within an operating system that prompts the operating system to launch or execute a file when the operating system performs a boot up operation (e.g., restarts, logs into a user account, etc.). In some examples, a file may create or deploy a loadpoint data entry within an operating system while the file is being installed or executed by the operating system. In particular, a file may create a registry key that contains an instruction for an operating system to access and execute the file via the file's filepath or storage location.

In one example, a file installed within a WINDOWS operating system may store a loadpoint data entry within a RUN or RUNONCE registry key. Loadpoint data entries within WINDOWS operating systems may be "trigrams" that contain three distinct pieces of information: (i) a loadpoint command, (ii) a name of a loadpoint data entry, and (iii) a filepath that points to a file to be launched. As an example, a loadpoint data entry "HKEY_USER\Software\Microsoft\Windows\Run\LoadpointEntryName" may point to a file named "LoadpointFilePath." In this example, "HKEY_USER\Software\Microsoft\Windows\Run" may represent the loadpoint command, "LoadpointEntryName" may represent the name of the loadpoint data entry, and "LoadpointFilePath" may represent the file that is to be launched. Other operating systems may implement alternative types of loadpoint data entries (e.g., "n-grams" with fewer or more pieces of information).

Notably, loadpoint data entries deployed by instances of the same file may differ across endpoint devices. Specifically, as illustrated in the example above, a loadpoint data entry may contain a name of a user account, a folder, and/or an operating system of a particular endpoint device. As such, a loadpoint data entry may reflect unique configurations of different endpoint devices. While loadpoint data entries created by instances of the same file may generally be similar, the disclosed systems may take into consideration possible variations of a loadpoint data entry when determining the reputation of the loadpoint data entry and/or its associated file.

In some examples, non-malicious files may deploy legitimate loadpoint data entries within an operating system. These legitimate loadpoint data entries may enable boot up operations of an operating system and/or enable critical pieces of software to properly and efficiently execute. However, malicious files (e.g., viruses, rootkits, adware, spyware, and other types of malware) may often deploy illegitimate loadpoint data entries. These illegitimate loadpoint data entries may cause an operating system to repeatedly execute malicious software. In addition, because a loadpoint data entry may not directly indicate the content of a file with which it is associated, traditional anti-malware systems may be unable to detect and remove loadpoint data entries associated with malicious files.

The systems described herein may identify a loadpoint data entry created by a file in a variety of ways. In some examples, identification module 104 may identify all or a portion of the loadpoint data entries within an endpoint device. For example, identification module 104 may search the registry keys of an endpoint device's operating system to identify each unique loadpoint data entry stored by the operating system. In some embodiments, identification module 104 may monitor a computing device to detect each time a new loadpoint data entry is created by a file installed on the computing device. Alternatively, identification module 104 may periodically search a computing device to identify existing or previously-created loadpoint data entries.

In some embodiments, identification module 104 may identify additional contextual information about an identified loadpoint data entry. For example, identification module 104 may determine a length of time that a loadpoint data entry has existed on an endpoint device. Specifically, identification module 104 may identify a time and/or date of the loadpoint data entry's creation. Additionally or alternatively, identification module 104 may identify a file that a loadpoint data entry causes to be executed (i.e., the file that created the loadpoint data entry). In some examples, identification module 104 may also identify the name, creator, or publisher of a file. Furthermore, identification module 104 may identify information about a file's reputation, such as security characteristics of the file or whether the file is known to be malicious or non-malicious. For example, identification module 104 may scan the file for indications of malware and/or determine whether an anti-malware service has flagged the file as a security threat.

In some embodiments, all or a portion of identification module 104 may represent or be contained within a client-side anti-malware agent. In one example, such an agent may be installed on each device that subscribes to an anti-malware service that provides the disclosed anti-malware systems. In this example, the instances of identification module 104 running on the endpoint devices may send information about identified loadpoint data entries to a backend security server managed by the anti-malware service. In addition, the instances of identification module 104 may send the backend security server any relevant contextual information about a loadpoint data entry.

At step 304 in FIG. 3, one or more of the disclosed systems may determine a reputation of the loadpoint data entry that indicates a reputation of the file. For example, reputation module 106 may, as part of security server 206 in FIG. 2, determine loadpoint reputation 122 of loadpoint data entry 212 that indicates file reputation 124 of file 210.

The term "reputation of a file," as used herein, generally refers to any type or form of indication or representation of whether a file is malicious or non-malicious. A reputation of a file may be based on any one or more security characteristics of the file, such as a reputation of a developer of the file and/or behaviors exhibited by the file. In general, files with good or non-malicious reputations may have been created by legitimate developers and/or may be designed to benefit the functioning or security state of an endpoint device. In contrast, files with bad or malicious reputations may have been created with malicious intent and/or are capable of harming or compromising the security state of an endpoint device. In addition, the term "reputation of a loadpoint data entry," as used herein, generally refers to any indication of a reputation of a file associated with a loadpoint data entry.

The systems described herein may determine reputations of loadpoint data entries and files in a variety of ways. In some examples, reputation module 106 may represent reputations on a binary scale (i.e., either "malicious" or "non-malicious"). In other examples, reputation module 106 may calculate reputations as values or scores within scales. For example, reputation module 106 may represent reputations as integers between 0 and 5, with a reputation of 0 indicating a highly malicious file and a reputation of 5 indicating a file confirmed to be non-malicious.

In some examples, reputation module 106 may determine a reputation of a loadpoint data entry based directly on a reputation of a file associated with the loadpoint data entry. For example, after identifying or determining the reputation of a file, reputation module 106 may assign the same or similar reputation to a loadpoint data entry created by the file. In one embodiment, reputation module 106 may determine the reputation of a file (and therefore the reputation of an associated loadpoint data entry) based on information received by identification module 104. For example, reputation module 106, running within a backend security server, may receive information from identification module 104 about a malware scan that was previously performed on a file by an anti-malware service running on the endpoint device on which the file is installed. Additionally or alternatively, reputation module 106 may determine a reputation of a file by performing any type or form of security analysis or test on the file. For example, reputation module 106 may compare a hash of a file to hashes of known malicious and known non-malicious files within a malware database. In another example, reputation module 106 may monitor behaviors of a file to determine whether the file exhibits malicious characteristics.

In some examples, reputation module 106 may determine a reputation of a loadpoint data entry based on information collected from multiple endpoint devices on which the loadpoint data entry was identified. For example, reputation module 106 may determine that instances of a particular loadpoint data entry (or similar loadpoint data entries) were identified on more than one endpoint device. In this example, reputation module 106 may determine the reputation of the loadpoint data entry based on a cumulative analysis of the reputations of each file associated with the identified instances of the loadpoint data entry. Specifically, reputation module 106 may determine a reputation of a loadpoint data entry based on a determination of whether the loadpoint data entry is more frequently associated with non-malicious files or malicious files.

In some embodiments, reputation module 106 may determine a reputation of a loadpoint data entry without analyzing the reputation of files associated with the loadpoint data entry. For example, reputation module 106 may determine a reputation of a loadpoint data entry based on the distribution or prevalence of the loadpoint data entry across a group of endpoint devices. In one embodiment, reputation module 106 may determine that a loadpoint data entry is non-malicious in the event that the loadpoint data entry is identified on a large number of endpoint devices (e.g., above a certain number or percentage of monitored endpoint devices). For example, reputation module 106 may determine that common or widespread loadpoint data entries are likely associated with non-malicious files, as non-malicious files are generally more prevalent on endpoint devices than malicious files. Accordingly, reputation module 106 may determine that a loadpoint data entry with a low prevalence across a group of endpoint devices is potentially indicative of a malicious file.

Additionally or alternatively, reputation module 106 may determine the reputation of a loadpoint data entry based on a length of time that the loadpoint data entry has existed on one or more endpoint devices. For example, reputation module 106 may determine that a loadpoint data entry that has existed for longer than a predetermined amount of time (e.g., one week, one month, etc.) is potentially indicative of a non-malicious file, as users and/or anti-malware systems may attempt to remove malicious files (and their associated loadpoint data entries) soon after the malicious files are installed. In general, reputation module 106 may determine a reputation of a loadpoint data entry using any one or combination of analyses, including analyses of both the content of files associated with the loadpoint data entry and the distribution of the loadpoint data entry across a group of endpoint devices.

As an example, FIG. 4 illustrates a security server 402 that determines reputations of loadpoint data entries identified on a group of endpoint devices (i.e., endpoint devices 404, 410, 416, 422, 428, and 434). In this example, security server 402 may be in communication with an agent installed on each endpoint device that identifies loadpoint data entries and relevant contextual information on the endpoint devices. FIG. 4 illustrates the distribution of two distinct loadpoint data entries (i.e., loadpoint data entry A and loadpoint data entry B) across the group of endpoint devices. In addition, FIG. 4 illustrates the reputation (i.e., either malicious or non-malicious) of each file identified in connection with the loadpoint data entries on the endpoint devices. The reputations of the files may have been determined by the agents on the endpoint devices or by security server 402.

In the example of FIG. 4, security server 402 may determine that loadpoint data entry A has a non-malicious reputation. In one embodiment, security server 402 may make this determination based on identifying loadpoint data entry A on a large number of endpoint devices (i.e., 5 out of 6 endpoint devices). Additionally or alternatively, security server 402 may make this determination based on determining that loadpoint data entry A is more frequently associated with non-malicious files than with malicious files. Specifically, security server 402 may determine that loadpoint data entry A is associated with four non-malicious files (i.e., non-malicious files 408, 420, 426, and 438) and only one malicious file (i.e., malicious file 414). In addition, security server 402 may determine that loadpoint data entry B has a malicious reputation. Security server 402 may make this determination based on identifying loadpoint data entry B on a small number of endpoint devices (i.e., 1 out of 6 endpoint devices) and/or based on determining that loadpoint data entry B is only associated with malicious files (i.e., malicious file 432).

Returning to FIG. 3, at step 306 one or more of the disclosed systems may detect, on an additional endpoint device, an attempt to install a suspicious file with a loadpoint data entry at least partially similar to the loadpoint data entry of the file installed on the endpoint device. For example, detection module 108 may, as part of security server 206 and/or endpoint device 208 in FIG. 2, detect an attempt on endpoint device 208 to install suspicious file 214 with loadpoint data entry 216.

The term "suspicious file," as used herein, generally refers to any file that is potentially illegitimate or malicious. In some examples, a suspicious file may represent any file whose reputation has not yet been determined.

The systems described herein may detect an attempt to install a suspicious file onto an endpoint device in a variety of ways. In some examples, detection module 108 may monitor all or a portion of the files that a user attempts to install onto an endpoint device. For example, detection module 108 may monitor a user's network behavior to detect attempts by the user to download and install files via the internet. Additionally or alternatively, detection module 108 may identify attempts to install files by monitoring installation processes on an endpoint device. While detecting and monitoring an attempt to install a file, detection module 108 may determine whether the file creates (or is attempting to create) a loadpoint data entry. In some examples, detection module 108 may block, cancel, or postpone an installation process of a file in the event that the installation process involves creating a loadpoint data entry. Specifically, detection module 108 may prevent an installation process from continuing until the disclosed systems have determined the reputation of the file being installed.

After determining that a file has created (or will create) a loadpoint data entry, detection module 108 may determine whether the loadpoint data entry is the same as or similar to a loadpoint data entry whose reputation is known. For example, detection module 108 may compare all or a portion of the identified loadpoint data entry to previously-identified loadpoint data entries to determine whether the identified loadpoint data entry matches a known loadpoint data entry (or is within a certain degree of similarity to a known loadpoint data entry). In the event that detection module 108 determines that a loadpoint data entry is new or unrecognized, the disclosed systems may gather information about the loadpoint data entry or the file associated with the loadpoint data entry, as discussed above in connection with steps 302 and 304. In the event that detection module 108 identifies a known or recognized loadpoint data entry, detection module 108 may direct the disclosed systems to determine the reputation of the loadpoint data entry (as will be discussed below).

At step 308 in FIG. 3, one or more of the disclosed systems may determine a reputation of the suspicious file based on the reputation of the loadpoint data entry of the file installed on the endpoint device. For example, reputation module 106 may, as part of security server 206 in FIG. 2, determine suspicious file reputation 126 of suspicious file 214 based on loadpoint reputation 124 of file 210.

The systems described herein may determine a reputation of a suspicious file in a variety of ways. In some examples, reputation module 106 may determine a reputation of a suspicious file based on a determination that the suspicious file is an instance of a file that created a known loadpoint data entry. For example, after detection module 108 determines that a suspicious file has a loadpoint data entry that matches a known loadpoint data entry, reputation module 106 may infer that the suspicious file is the same as the file that created the known loadpoint data entry. As such, reputation module 106 may determine that the reputation of the suspicious file is the same as the reputation of the known loadpoint data entry.

At step 310 in FIG. 3, one or more of the disclosed systems may protect the additional endpoint device from security threats by performing a security action on the suspicious file based on the reputation of the suspicious file. For example, security module 110 may, as part of security server 206 and/or endpoint device 208 in FIG. 2, protect endpoint device 208 from security threats by performing security action 218 on suspicious file 214 based on suspicious file reputation 126.

The term "security action," as used herein, generally refers to any type or form of step or process designed to prevent a malicious file from harming a computing device. In some examples, the disclosed systems may perform security actions in accordance with security policies implemented by an administrator or user.

The disclosed systems may perform a security action on a suspicious file in a variety of ways. In the event that reputation module 106 determined that a file is malicious based on its loadpoint data entry, security module 110 may prevent an endpoint device from installing or accessing the file. For example, security module 110 may terminate an installation process on the endpoint device that is attempting to install the file, prevent the file from launching or executing on the endpoint device, and/or block the endpoint device from copying the file into storage. In the event that reputation module 106 determined that a file is non-malicious, security module 110 may permit the file to be installed on an endpoint device. Additionally, in the event that reputation module 106 determined that a file is potentially malicious (but is not confirmed to be malicious), security module 110 may perform actions such as alerting a user or administrator about the risks associated with the file, conducting an additional security analysis on the file, and/or permitting the file to be launched while monitoring the file for malicious behaviors.

Figure 5:
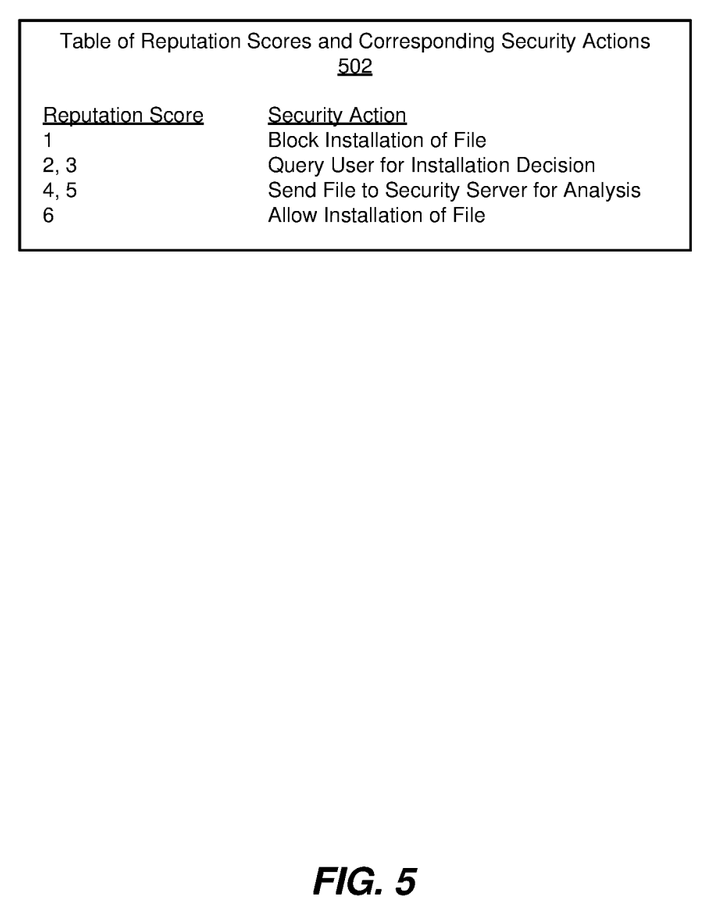
FIG. 5 is an illustration of an example table of reputation scores of suspicious files and corresponding security actions.

In some embodiments, security module 110 may perform particular security actions on files falling within certain reputation score levels or thresholds. As an example, FIG. 5 illustrates a table of reputation scores and corresponding security actions 502. In this example, reputation module 106 may assign loadpoint data entries and files reputations as scores between 1 and 6, with a score of 1 indicating a highly malicious file and a score of 6 indicating a non-malicious file. In accordance with the security actions described in table 502, security module 110 may block files with reputation scores of 1 from being installed on endpoint devices. In addition, security module 110 may only allow files with reputation scores of 2 and 3 (which indicate likely malicious files) to be installed after a user provides input prompting the installation. Furthermore, security module 110 may send files with reputation scores of 4 and 5 (which indicate likely non-malicious files) to a backend security server for additional analysis. Finally, security module 110 may permit files with reputation scores of 6 to be installed with no additional security action taken.

In some examples, security module 110 may protect an endpoint device from malicious files that are already installed on or stored within the endpoint device. For example, security module 110 may periodically identify loadpoint data entries within an endpoint device and compare the identified loadpoint data entries to loadpoint data entries with known reputations (e.g., recently discovered or updated reputations). In this way, security module 110 may improve the performance of both dynamic malware detections and static malware scans.

As explained above in connection with FIGS. 3-5, an anti-malware service may determine reputations of files that users are attempting to install by comparing loadpoint data entries of the files to loadpoint data entries with known reputations. The anti-malware service may determine reputations of loadpoint data entries by collecting data about loadpoint data entries on multiple endpoint devices (e.g., using telemetry techniques via agents installed on the endpoint devices). In particular, the anti-malware service may analyze factors such as malware detections associated with a loadpoint data entry, a prevalence or distribution of a loadpoint data entry across a group of endpoint devices, and/or an age of a loadpoint data entry (e.g., how long the loadpoint data entry has existed on one or more endpoint devices). In this way, the anti-malware service may quickly determine the reputation of a suspicious or unverified file based on its loadpoint data entry (and thus avoid an in-depth analysis of the content or behaviors of the file).

Figure 6:
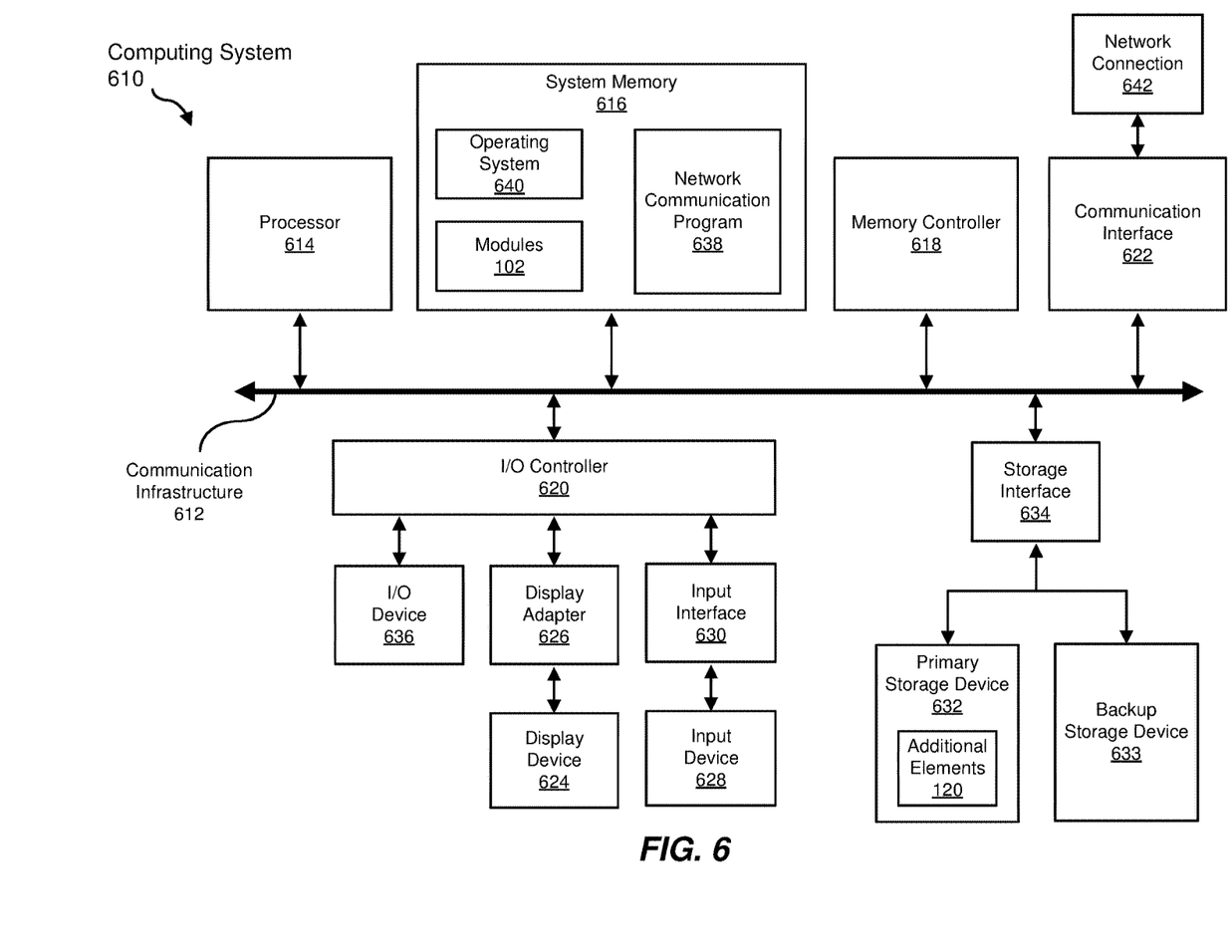
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, [additional elements 120] from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
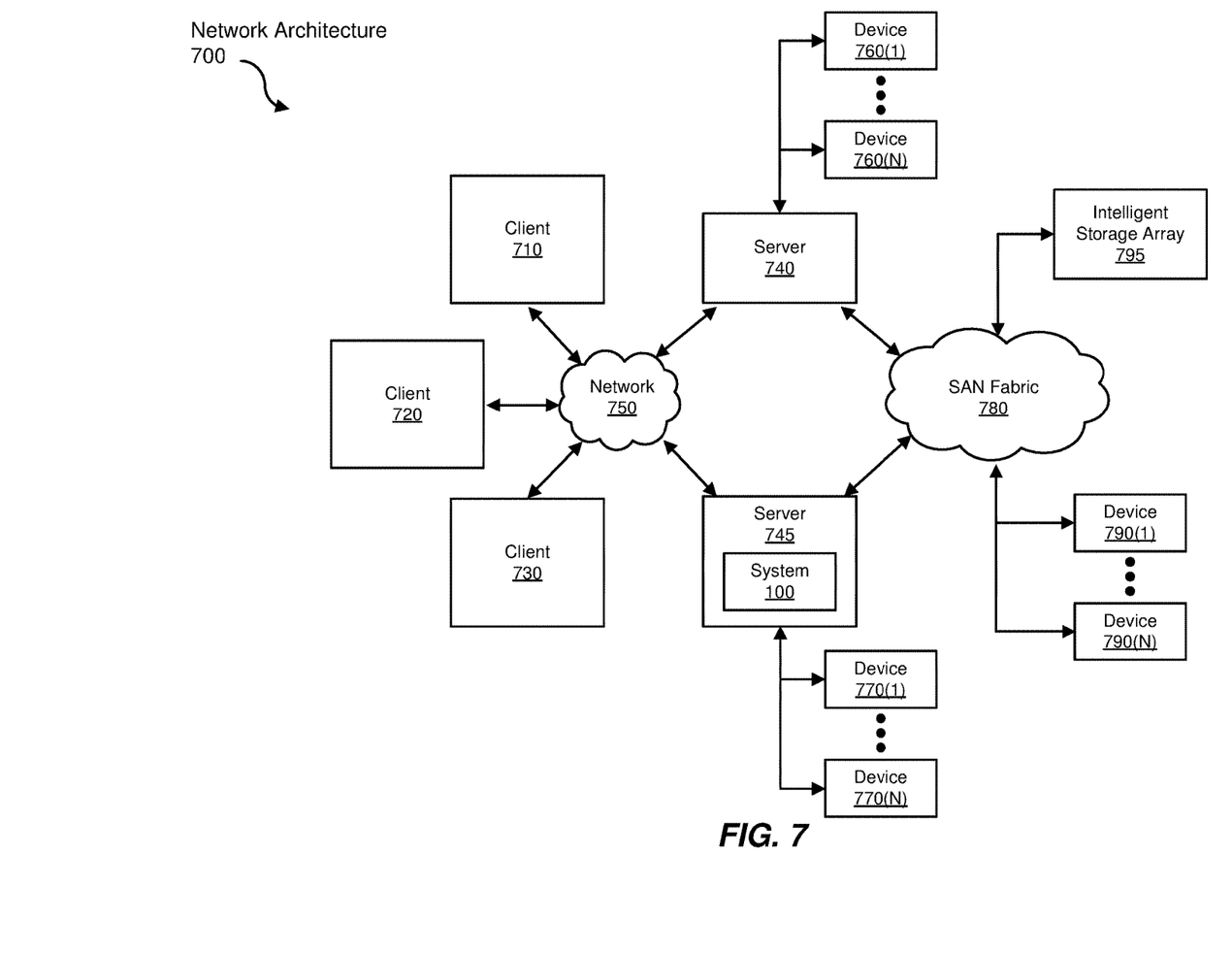
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for determining reputations of files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive loadpoint data entries identified on endpoint devices to be transformed, transform the identified loadpoint data entries into reputations of files associated with loadpoint data entries, output a result of the transformation to endpoint devices attempting to install files with the loadpoint data entries, use the result of the transformation to prevent endpoint devices from installing malicious files, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for determining reputations of files, at least a portion of the method being performed by a computing device comprising at least one processor, the method comprising:
   identifying, on an endpoint device, a loadpoint data entry created by a file installed on the endpoint device that directs an operating system of the endpoint device to execute the file during boot up operations of the endpoint device;
   determining a reputation of the loadpoint data entry created by the file installed on the endpoint device that indicates a reputation of the file installed on the endpoint device;
   detecting, on an additional endpoint device, an attempt to install a suspicious file with a loadpoint data entry at least partially similar to the loadpoint data entry of the file installed on the endpoint device;
   determining a reputation of the suspicious file based on the reputation of the loadpoint data entry of the file installed on the endpoint device; and
   protecting the additional endpoint device from security threats by performing a security action on the suspicious file based on the reputation of the suspicious file.

2. The method of claim 1, wherein identifying the loadpoint data entry on the endpoint device comprises identifying a registry key that points to a filepath of the file.

3. The method of claim 1, wherein identifying the loadpoint data entry on the endpoint device comprises receiving, at a backend security server, each unique loadpoint data entry identified on a plurality of endpoint devices by a security agent installed on the plurality of endpoint devices.

4. The method of claim 3, wherein determining the reputation of the loadpoint data entry comprises determining whether the loadpoint data entry is more frequently associated with files installed on the plurality of endpoint devices known to be malicious or files installed on the plurality endpoint devices known to be non-malicious.

5. The method of claim 3, wherein determining the reputation of the loadpoint data entry comprises determining a prevalence of the loadpoint data entry across the plurality of endpoint devices, wherein a low prevalence indicates a malicious reputation.

6. The method of claim 3, wherein determining the reputation of the loadpoint data entry comprises determining a length of time that each of the plurality of endpoint devices has stored the loadpoint data entry, wherein a large amount of time indicates a non-malicious reputation.

7. The method of claim 1, wherein detecting the attempt to install the suspicious file on the additional endpoint device comprises blocking the attempt to install the suspicious file until determining the reputation of the suspicious file.

8. The method of claim 1, wherein detecting the attempt to install the suspicious file on the additional endpoint device comprises monitoring an installation process of the suspicious file to identify the loadpoint data entry created by the suspicious file during the installation process.

9. The method of claim 1, wherein:
determining the reputation of the suspicious file comprises determining that the suspicious file is non-malicious; and
performing the security action on the suspicious file comprises permitting the suspicious file to be installed on the additional endpoint device.

10. The method of claim 1, wherein:
determining the reputation of the suspicious file comprises determining that the suspicious file is potentially malicious; and
performing the security action on the suspicious file comprises at least one of:
prompting a user of the additional endpoint device to determine whether to install the suspicious file on the additional endpoint device; and
sending the suspicious file to a backend security server to analyze content of the suspicious file.

11. The method of claim 1, wherein:
determining the reputation of the suspicious file comprises determining that the suspicious file is malicious; and
performing the security action on the suspicious file comprises preventing the file from being installed on the additional endpoint device.

12. A system for determining reputations of files, the system comprising:
an identification module, stored in memory, that identifies, on an endpoint device, a loadpoint data entry created by a file installed on the endpoint device that directs an operating system of the endpoint device to execute the file during boot up operations of the endpoint device;
a detection module, stored in memory, that detects, on an additional endpoint device, an attempt to install a suspicious file with a loadpoint data entry at least partially similar to the loadpoint data entry of the file installed on the endpoint device;
a reputation module, stored in memory, that:
determines a reputation of the loadpoint data entry created by the file installed on the endpoint device that indicates a reputation of the file installed on the endpoint device; and
determines a reputation of the suspicious file based on the reputation of the loadpoint data entry of the file installed on the endpoint device;
a security module, stored in memory, that protects the additional endpoint device from security threats by performing a security action on the suspicious file based on the reputation of the suspicious file; and
at least one physical processor configured to execute the identification module, the detection module, the reputation module, and the security module.

13. The system of claim 12, wherein the identification module identifies the loadpoint data entry on the endpoint device by identifying a registry key that points to a filepath of the file.

14. The system of claim 12, wherein the identification module identifies the loadpoint data entry on the endpoint device by receiving, at a backend security server, each unique loadpoint data entry identified on a plurality of endpoint devices by a security agent installed on the plurality of endpoint devices.

15. The system of claim 14, wherein the reputation module determines the reputation of the loadpoint data entry by determining whether the loadpoint data entry is more frequently associated with files installed on the plurality of endpoint devices known to be malicious or files installed on the plurality endpoint devices known to be non-malicious.

16. The system of claim 14, wherein the reputation module determines the reputation of the loadpoint data entry by determining a prevalence of the loadpoint data entry across the plurality of endpoint devices, wherein a low prevalence indicates a malicious reputation.

17. The system of claim 14, wherein the reputation module determines the reputation of the loadpoint data entry by determining a length of time that each of the plurality of endpoint devices has stored the loadpoint data entry, wherein a large amount of time indicates a non-malicious reputation.

18. The system of claim 12, wherein the detection module blocks the attempt to install the suspicious file until the reputation of the suspicious file is determined.

19. The system of claim 12, wherein the detection module monitors an installation process of the suspicious file to identify the loadpoint data entry created by the suspicious file during the installation process.

20. A non-transitory computer-readable medium comprising one or more computer-executable instructions that, when executed by at least one processor of a computing device, cause the computing device to:
identify, on an endpoint device, a loadpoint data entry created by a file installed on the endpoint device that directs an operating system of the endpoint device to execute the file during boot up operations of the endpoint device;
determine a reputation of the loadpoint data entry created by the file installed on the endpoint device that indicates a reputation of the file installed on the endpoint device;
detect, on an additional endpoint device, an attempt to install a suspicious file with a loadpoint data entry at least partially similar to the loadpoint data entry of the file installed on the endpoint device;
determine a reputation of the suspicious file based on the reputation of the loadpoint data entry of the file installed on the endpoint device; and
protect the additional endpoint device from security threats by performing a security action on the suspicious file based on the reputation of the suspicious file.

* * * * *